Sept. 29, 1959     W. HÖFLER     2,906,030
GEAR TESTING APPARATUS
Filed Sept. 18, 1956     5 Sheets-Sheet 1
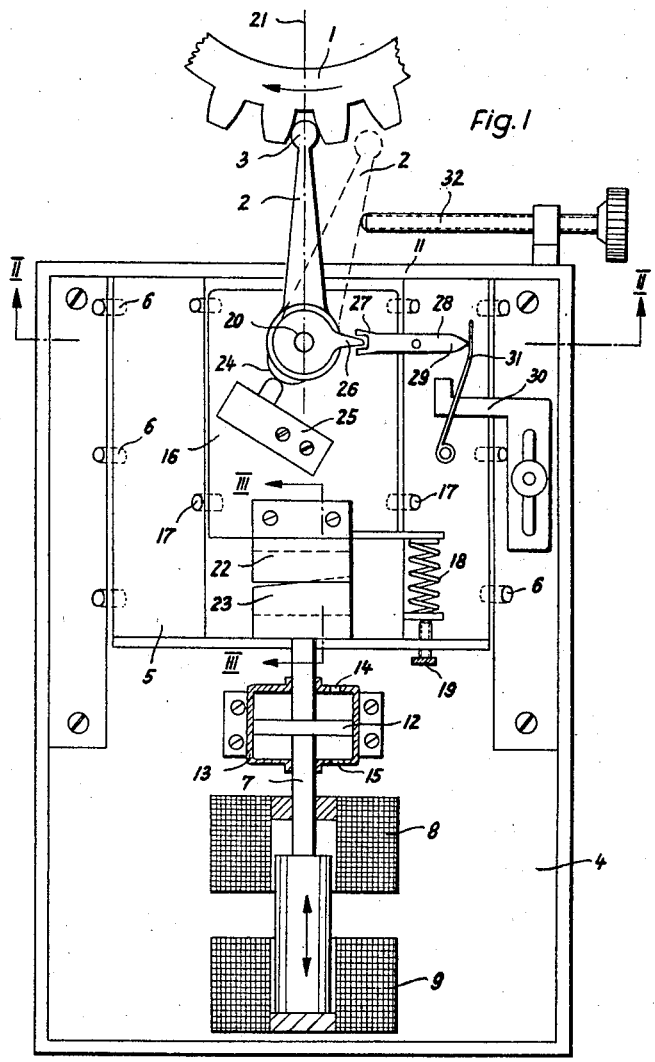
Fig. 1
Fig. 2
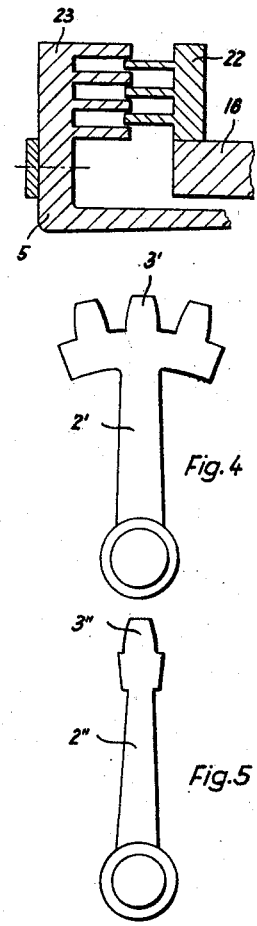
Fig. 3
Fig. 4
Fig. 5
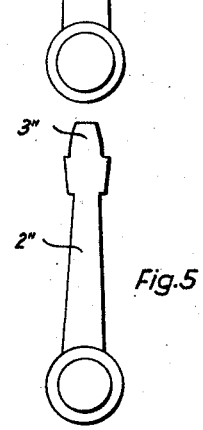
Fig. 6
INVENTOR.
Willy Höfler
BY Bailey Stephens & Huettig
Attorneys

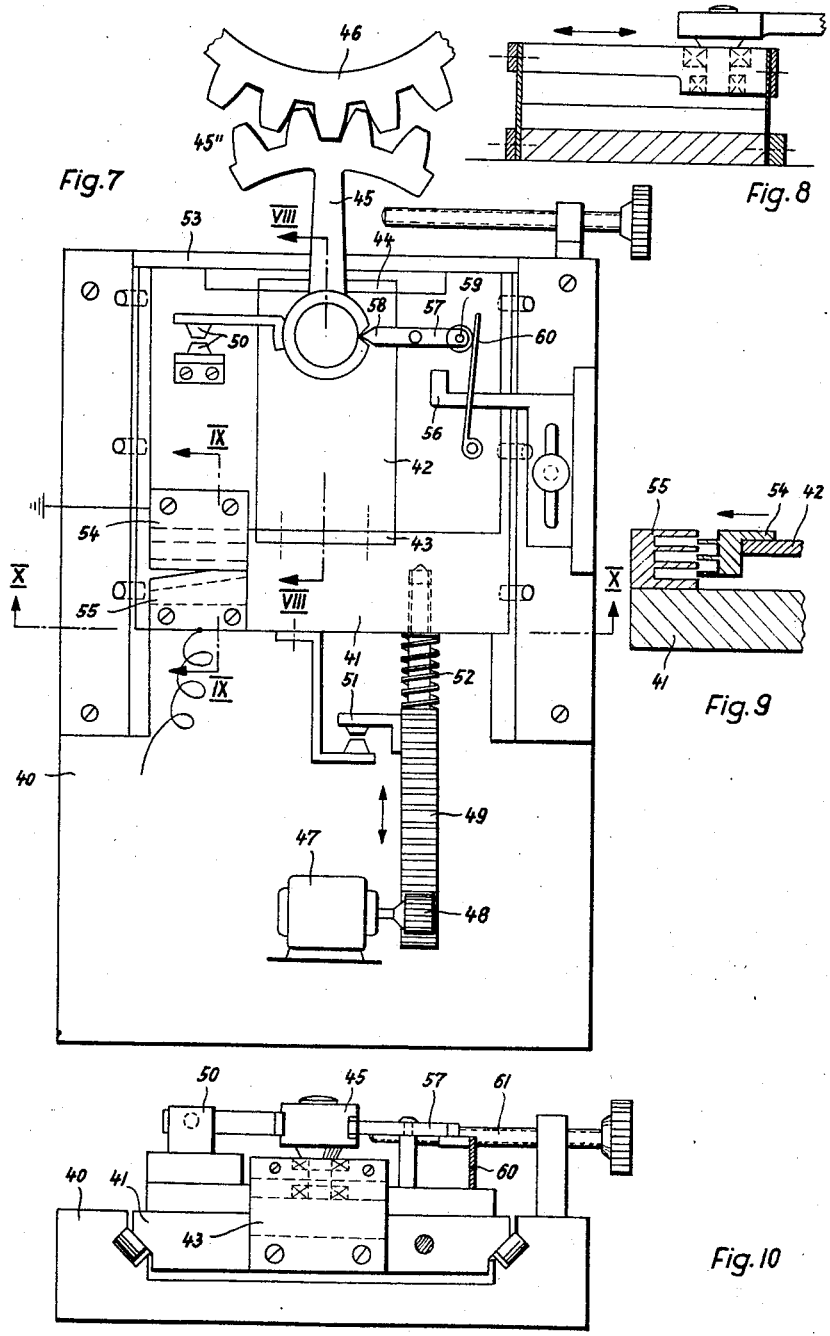

Sept. 29, 1959   W. HÖFLER   2,906,030
GEAR TESTING APPARATUS

Filed Sept. 18, 1956   5 Sheets-Sheet 3

INVENTOR.
Willy Höfler
BY
Bailey Stephens & Huettig
Attorneys

Sept. 29, 1959 W. HÖFLER 2,906,030
GEAR TESTING APPARATUS
Filed Sept. 18, 1956 5 Sheets-Sheet 4

INVENTOR.
Willy Höfler
BY
Bailey, Stephens & Huettig
Attorneys

# United States Patent Office

2,906,030
Patented Sept. 29, 1959

2,906,030

GEAR TESTING APPARATUS

Willy Höfler, Karlsruhe, Germany

Application September 18, 1956, Serial No. 610,464

Claims priority, application Germany September 21, 1955

8 Claims. (Cl. 33—179.5)

The present invention relates to an apparatus for measuring and testing gears and the like. More particularly, the invention relates to an automatically operating apparatus for determining and measuring tooth and tooth-spacing errors of various types, as well as errors of concentricity especially on gears and other objects having gear teeth or the like.

Prior to this invention, various types of testing apparatus have been known in which the test object was measured while at a stand-still and was advanced after each measurement by one tooth pitch either by hand or by a motor or the like so that the next measurement could then be carried out. In order to obtain accurate results and prevent errors in measurement, these apparatus required that the test object was to be advanced by one or more pitches with the utmost precision. This, as well as the intermittent and accurate pitch-by-pitch movement of the test object, required considerable time, as well as special testing devices upon which the test object had to be mounted. It was therefore also particularly difficult to test or measure very large objects, while the testing of built-in parts, such as spur or bevel gears, racks, worms, worm gears, or the like, or gear-cutting tools while mounted in gear-cutting machines was entirely impossible.

It is the object of the present invention to provide an apparatus which overcomes the above-mentioned disadvantages in that the test object does not need to be advanced by exactly one pitch between the individual measurements, but in which such test object is moved continuously and preferably at a constant speed, even while the measurements are being carried out.

A testing or measuring procedure of this kind does not require the test object to be mounted on a special testing device which advances the object by exactly one pitch, and it therefore permits even built-in or very large parts to be tested without difficulty.

A further object of the present invention is to provide an apparatus of the type as described which may be operated and will carry out the required measurements fully automatically.

Another object of the present invention is to provide such a testing and measuring apparatus in which the results of the required measurements are of a very high accuracy, and in which such results may be attained successively and may also be permanently recorded.

A further object is to provide an apparatus of the mentioned kind which may be used for carrying out a large variety of different types of measurements, and particularly for determining and measuring different kinds of tooth and tooth-spacing errors, errors of concentricity, and the like.

The important features of the invention for attaining the above-mentioned objects consist in the provision of a periodically reciprocating slide and of at least one measuring feeler which is pivotally mounted thereon, and of means for pivoting the feeler laterally during the period when the slide is being retracted, for inserting the front end of the feeler during the advancing movement of the slide into a tooth gap of a continuously moving test object prior to the time when the latter reaches the measuring position for permitting the feeler then to be taken along by the moving test object to a point beyond the measuring position and thereby to carry out a pivotal movement, and in the provision of means responsive to the pivotal movement of the feeler for automatically controlling the advance and return movements of the slide.

Broadly speaking, the operation of the new measuring and testing apparatus consists in that one or a pair of measuring feelers, which is inserted into a tooth gap of the continuously moving test object before the latter reaches the measuring position, will by such engagement be taken along by the test object into the measuring position thereof and then be pivoted beyond such position. The test or measurement is then carried out while the test object as well as the feeler move through the measuring position. The further pivoting movement of the feeler or feelers then initiates or controls the periodical retraction and subsequent advance of the slide for the next measuring operation. During such retraction, the feeler is automatically pivoted in the opposite direction to such an extent that it will surely and properly engage into the next tooth gap when the slide again advances.

If gears are to be tested for errors in concentricity of the teeth or for tooth thickness or tooth gap errors, the feeler is preferably provided with a measuring tip made in the form of a ball, wedge, or gear tooth which is to be inserted into the tooth gaps. For errors of concentricity, two face errors, and the like, the feeler tip is preferably made in the shape of a gear sector. In either of these cases, the radial depth of insertion of the feeler into the tooth gaps of the gear or other test object will be evaluated. The testing unit is for this purpose preferably designed so that the main slide, the movement of which in the direction toward the test object is limited by a stop member, carries a second measuring slide which, in turn, carries the pivotable measuring feeler and is movable toward the test object under the action of a spring which determines the measuring pressure of the feeler and is made adjustable to vary such pressure. After the feeler has been inserted into a tooth gap and into engagement with the tooth faces, the pivotal movement of the feeler caused by the continuous movement of the test object will then cause this second slide to move back from the test object. The maximum distance of this measuring slide from the test object will then be measured and registered by an electric measuring system preferably of the capacitative type. In such measuring procedure, the feeler is inserted into the tooth gap at a point prior to the measuring position and it is then taken along by the test object beyond the so-called "high point," i.e. the measuring position, which will be reached when the axis of rotation of the test object, the pivotal axis of the feeler, and the tip of the latter all fall within a straight line. The measuring slide will therefore at first move away from the test object until the "high point" is reached, and it will then again move toward the test object. A recording of this movement of the measuring slide results in a single-peak curve for each measured tooth pitch, the deviations of the adjacent maximum values relative to each other then constituting a value for determining the tooth spacing and pitch errors, as well as tooth thickness and tooth gap errors, while a deviation of the peak values within such a series of maximum values constitutes a value for determining errors in concentricity.

A further object of the present invention is to provide a measuring apparatus of the kind as described which permits the measuring procedure to be carried out very quickly, with the utmost precision, and with as little inertia as possible, and in which the measuring pressure applied is made as low as possible.

Another important object of the invention is to provide such apparatus in which the measured results will also be automatically and continuously registered or recorded.

The features of the invention for accomplishing these objects consist in providing a variable condenser which forms an element of the electric measuring system of the new apparatus, and in mounting one plate of such condenser on the measuring slide and the other plate on the main slide which is periodically moved toward and away from the test object intermediate the individual measurements of each series but is held in a fixed position during the actual measurements. The changing distance between the condenser plate on the movable measuring slide and such fixed condenser plate results in changes in the condenser capacity which is then electrically evaluated in a manner known as such by means of a heterodyne circuit.

After passing beyond the measuring position, i.e. the so-called "high point," the feeler has to be disengaged from the test object and then to be inserted into the next tooth gap to be measured on the test object which during all this time continues to move without interruption. For this purpose, it is necessary that the main slide carrying the measuring slide together with the feeler be retracted from the test object and subsequently again be advanced toward the same. According to a preferred embodiment of the invention, this may be accomplished by the action of the feeler which, after passing beyond the measuring position, operates an electric switch so as to start the return movement of the main slide. The main slide further carries a pivotable lever, one end of which is flexibly connected with the feeler on the measuring slide, while during the return movement of the main slide the other end of this lever engages upon an adjustable stop which is mounted on a stationary part of the apparatus. Thus, when after the conclusion of each measurement, the feeler has become disengaged from the teeth of the moving test object and is moved backwardly by the retraction of the main slide which also carries the mentioned lever, such retraction also brings the outer or free end of the lever into engagement with the stop member. Since the other end of this lever is flexibly coupled with the feeler, the continued retraction of the main slide will then pivot this other end of the lever which will thus turn the feeler in the direction opposite to its movement by the action of the test object. Such pivotal movement of the feeler will then again actuate the mentioned electric switch so as to start the advancing movement of the main slide. In order to insure that the feeler will be pivoted back to such a degree that its tip will properly enter into the next following tooth gap when the main slide is advanced, a spring is provided to act upon the outer end of the mentioned lever in such a manner that, when the pivotal return movement of the feeler has been initiated by the retraction of the main slide and its action upon the lever as above described, this lever and thus also the feeler will be flipped over by the spring in a manner similar to the operation of a toggle switch until the feeler engages with an adjustable stop member which determines the angle to which the feeler may pivot.

The means provided according to the invention for reciprocating the main slide toward and away from the test object may, for example, consist of a pair of electromagnets which are alternately energized by the operation of the switch which is controlled by the feeler. The common armature of these two magnets which is connected with the main slide so as to drive the same in either direction is preferably provided with a piston which is adapted to be reciprocated in a cylinder so as to act as a shock absorber and produce a smooth and steady movement of the main slide. According to another and preferred embodiment of the invention, the reciprocating means consist of an electric motor, the driving pinion of which engages with a rack so as to advance or retract the main slide. This motor is switched on to rotate in one direction and its movement is then reversed by the operation of the switch which is controlled by the feeler, as above described, and it is cut off by a circuit breaker by means of contactors or the like.

The apparatus according to the present invention may be used not only for testing gears and the like by measuring the radial depth of entry of the feeler tip in the shape of a ball, wedge, gear tooth, or gear sector into the tooth gaps of the test object, but also for measuring tooth and tooth spacing errors by determining the aberrations in a tangential direction, that is, from one tooth face toward the other, or also those in the direction of the line of contact of involute teeth which is usually inclined at an angle of about 20° to the tangent line.

For such types of measurements a pair of measuring feelers are pivotally mounted directly on the main slide which is periodically reciprocated, so that the tips of both feelers engage in two adjacent tooth gaps of the continuously moving test object and each against one of the tooth faces defining these gaps. The feeler tips are thus carried along by these tooth faces so that both feelers will carry out a pivotal movement in the same direction and beyond the measuring position. Since in this case it is the angular position of the feelers which determines whether the teeth of the test object are accurately shaped, each of the pivotable feelers is provided with a condenser plate which is associated with a stationary condenser plate so as to form a variable condenser. The pivoting movements of the feelers then produce a change in capacity of each of these two variable condensers. For determining the measuring position through which the two feelers pass by being carried along by the continuously moving test object, it has been found to be of particular advantage if the variable frequency produced in a heterodyne circuit from the capacity of one of the two condensers, when reaching a certain value, is utilized to operate a control mechanism which transfers the particular capacity value of the other condenser to an electric measuring system and, after a certain adjustable delay, controls the subsequent advance of the slide. In such case, the measurement must be carried out without inertia due to the fact that the test object is moved continuously and thereby pivots the measuring feelers which consequently vary the capacity values of their respective condensers continuously. The control mechanism which transfers the capacity value of one of the two condensers to the electrical measuring system at the particular moment when the feelers pass through the measuring position must therefore be designed in a manner known as such in the form of an electronic switch which operates free of any inertia.

For advancing and retracting the slide periodically, it is again preferable to provide an electric motor, the driving pinion of which is geared with a rack which is connected with the slide to move the same. The motor is switched on and its direction of rotation is subsequently reversed by the mentioned control mechanism, while its movement is stopped by means of a circuit breaker operated by contactors. If the periodic movement of the slide is produced by a motor, a pinion and a rack, it has been found advisable that a compression spring be interposed between the rack and the slide so that, after the slide has completed its advancing movement by engaging with a stop member, the rack will be able to continue its forward movement. The rack is then connected with the circuit breaker in such a manner that it will open the same during such continued forward movement. Finally, suitable means may be preferably provided for adjusting the speed of the motor and thus the advancing and re-tracting speed of the slide.

The embodiment of the measuring apparatus according to the invention in which a tangential measurement is carried out by means of two pivotable feelers, likewise requires the feeler tips while disengaged from the test object to be pivoted back to such an extent that they will properly engage into the next two tooth gaps when the slide again advances to its forward position. It is for this purpose merely necessary to provide a suitable spring on each feeler which automatically returns the latter to a certain starting position. By adjusting the speed of movement of the test object relative to that of the slide or vice versa, it will then be possible to insert the feeler tips each time properly into the next following tooth gaps. Because of the continuous movement of the test object, the tooth faces next to be tested will then take along the feeler tips and thereby tension the mentioned springs for the subsequent pivotal return movement of the feelers.

In place of the capacitative measuring system as previously described it is also possible to use an inductively operating system. In that case, the condensers are to be replaced by induction coils of variable induction. Also, instead of recording the measured results which have been evaluated by the measuring system, as previously described, it is also possible to indicate these results in the form of individual values or to reproduce them audibly in the form of sound frequencies which, if desired, may be recorded, for example, on a tape or wire recorder.

It is furthermore possible to use the measured values as control values for an automatic control mechanism which continuously and automatically corrects the errors which have been determined by the new apparatus, for example, on a gear-cutting tool of a gear-cutting machine while the same is in operation, so that the respective workpiece when finished will not be afflicted with the defects and faults of the generating machine.

Further objects, features, and advantages of the present invention will be apparent from the following detailed description, particularly when read with reference to the accompanying drawings, in which:

Fig. 1 shows a plan view of a first embodiment of the testing unit according to the invention;

Fig. 2 shows a cross section taken along line II—II of Fig. 1;

Fig. 3 shows a cross section taken along line III—III of Fig. 1;

Fig. 4 shows a feeler designed in the shape of a gear sector;

Fig. 5 shows a feeler designed in the shape of a gear tooth;

Fig. 6 shows a circuit diagram of the electric connections of the electromagnets of the unit according to Fig. 1;

Fig. 7 shows a plan view of a second embodiment of the testing unit according to the invention;

Fig. 8 shows a partial cross section as taken along line VIII—VIII of Fig. 7;

Fig. 9 shows a partial cross section as taken along line IX—IX of Fig. 7;

Fig. 10 shows a cross section taken along line X—X of Fig. 7;

Fig. 14 shows a cross section taken along line XIV—XIV of Fig. 13, while

Figure 11:
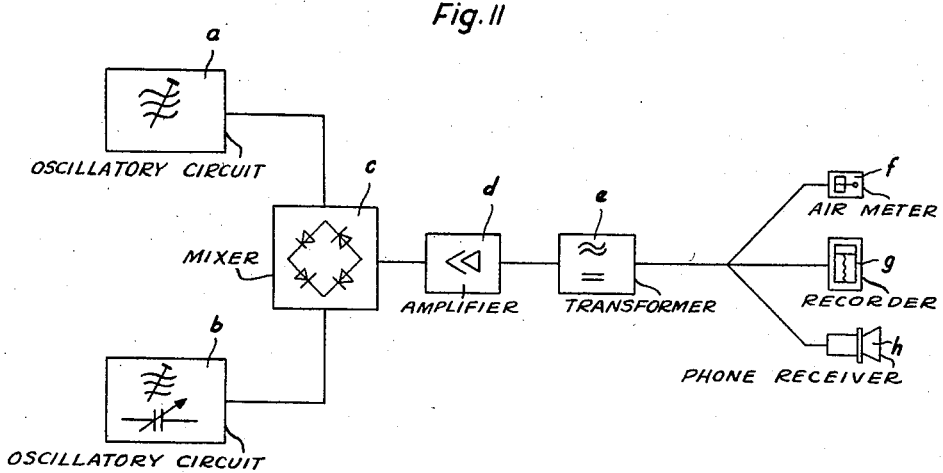
Fig. 11 shows a unit circuit diagram of the measuring system.

Referring to the drawings, and first particularly to Figs. 1 to 6, showing the first embodiment of the testing unit according to the invention, the test object, which in this testing example is shown in the form of a gear, is driven in the direction shown by the arrow by means not shown, and preferably continuously and at a constant speed.

A measuring feeler 2 terminates at one end in a ball 3 which is adapted to engage into a tooth gap of the test object 1. For different types of measurements, feeler 2 may by replaced by one with a measuring end of any other suitable shape, for example, by a feeler 2' or 2'', as shown in Figs. 4 and 5, respectively, which terminates in a gear sector 3' or a gear tooth 3'', respectively.

The testing unit as such is independent from the test object 1 and comprises a base 4 on which a main slide 5 is mounted so as to be easily slidable thereon in a longitudinal direction by means of rollers 6. Slide 5 carries a rod-shaped armature 7 which may be reciprocated in the direction shown in Fig. 1 by a two-pointed arrow by two electromagnets 8 and 9 which are secured to base 4 behind each other so that slide 5 may be reciprocated in the direction toward test object 1 by the alternate operation of magnets 8 and 9. A stop ledge 11 at the front edge of base 4 limits the forward movement of slide 5. In order to insure that slide 5 will carry out its movements quickly and smoothly when electromagnets 8 and 9 are alternately energized, an intermediate portion of the connecting rod of armature 7 is provided with a shock absorber consisting of a piston 12 which is mounted on or forms a part of armature rod 7 and is adapted to reciprocate within a cylinder 13 mounted on base 4. Cylinder 13 is provided with small vents 14 and 15 through which the air compressed by piston 12 may only pass slowly either into or out of cylinder 13 so that the movements of slide 5 will thus be damped.

Main slide 5 supports a measuring slide 16 which is easily slidable thereon by means of rollers 17 which are disposed and movable in a direction parallel to rollers 6. Slide 16 is urged constantly in the direction toward test object 1 by a spring 18 which is interposed between and acts upon slides 5 and 16, and the tension of which may be adjusted by a setscrew 19. Slide 16 carries the feeler 2, a vertical pivot pin 20 of which is rotatably mounted within ball bearings 21 on slide 16. When main slide 5 is in its forward end position as shown in Fig. 1 in which it is stopped by ledge 11, the ball-shaped tip 3 of feeler 2 engages into a tooth gap of test object 1. Spring 18 then furnishes the required measuring pressure which may be adjusted by set-screw 19 and under which feeler tip 3 engages with the tooth faces of test object 1.

By such engagement of feeler 2 with test object 1, the movement of the latter in the direction shown in Fig. 1 by the arrow is transmitted to feeler tip 3 so as to pivot feeler 2 in a counterclockwise direction. If the feeler tip 3 is made to engage into a tooth gap of test object 1 when in the outwardly pivoted position indicated in Fig. 1 in dotted lines, slide 16 will then at first be moved forwardly as far as possible toward test object 1 by the action of spring 18. In the course of the pivotal movement of feeler 2 toward the solid line position thereof as shown in Fig. 1, slide 16 is then made to retract from the test object and, after passing beyond this so-called "high point" i.e. the measuring position, it again moves toward test object 1. This "high point" will be reached when the center of gear 1, the pivotal axis 20 of feeler 2, and feeler tip 3 all fall within a straight line 21, as indicated by the dot-and-dash line in Fig. 1. The maximum distance of slide 16 from test object 1 at the time when it passes the "high point" constitutes the value to be measured, and, when measuring one tooth gap after the other, the differences between the individual maximum distances indicate the tooth errors of test object 1. For determining these maximum distances, slide 16 has secured thereto a condenser plate 22 which is operatively associated with another condenser plate 23 which is secured to slide 5. The movements of slide 16 relative to slide 5, which is held arrested in its most forward position, result in changes in distance between condenser plates 22 and 23 and thus in changes in the capacity of the condenser formed of these two plates. These changes in capacity are then evaluated in a heterodyne circuit of a type known as such in which such capacity is first converted into a frequency which is then compared with an adjustable standard frequency and then amplified and converted into current or voltage values which are finally registered, recorded, or made audible by being transformed into sound frequencies.

After feeler 2 has thus served for measuring one tooth gap in the manner as above described, and after it has passd beyond the "high point," electromagnet 9 will be energized to retract slide 5 and thus also slide 16, whereupon electromagnet 9 will be deenergized and electromagnet 8 energized to advance slide 5 again up to stop ledge 11. Since, during the retracting movement, feeler 2 has been pivoted by a mechanism as subsequently described into the position shown in Fig. 1 in dotted lines, the subsequent advance of slide 5 will then move the measuring tip 3 into engagement with the next following tooth gap of the rotating test object 1.

The operation of electromagnets 8 and 9 is directly controlled by feeler 3 when the latter is being pivoted by the rotating movement of test object 1. For this purpose, the hub of feeler 2 is provided with a cam 24 which, after passing beyond the "high point," actuates a switch 25 as indicated diagrammatically in Fig. 1 and in the circuit diagram of Fig. 6, whereby electromagnet 9 will be energized and slide 5 be retracted.

The hub of feeler 2 further carries a lateral fingerlike projection 26 which engages into the bifurcated end 27 of a two-armed lever 28 which is pivotally mounted on slide 5.

During the retraction of slide 5, the other end 29 of lever 28 engages with a stop member 30 which is adjustably secured to base 4. Lever 28 is thereby pivoted counterclockwise, resulting in a pivotal movement of feeler 2 from the full-line position to the dotted-line position as shown in Fig. 1. After lever 28 has started its pivotal movement by abutting against stop member 30, a spring 31 acting upon the end 29 of lever 28 will then pivot the lever to such an extent that feeler 2 will engage with a setscrew 32 by means of which the angular deflection of feeler 2 may be adjusted to any desired position. Lever 28 and spring 31 thus cooperate with each other in a manner similar to a toggle switch.

During the retraction of slide 5, the pivotal movement of feeler 2 as just described moves cam 24 on the hub of the feeler into engagement with switch 25, thus again actuating the same and thereby disconnecting the electromagnet 9 and connecting electromagnet 8, so that slide 5 will again move forwardly. The same process as above described will then be repeated by the movement of feeler 2 through its engagement with the rotating test object 1, measuring slide 16 thus first retracting from the test object until the "high point" is reached, and then again moving toward the test object. The resulting change in the capacity of the condenser 22, 23 will then be evaluated by the electric measuring apparatus and results in a single-peak curve, the peak value of which constitutes the value to be measured of the respective tooth gap.

Fig. 3 shows a cross section taken through the two condenser plates 22 and 23 which are of comblike shape and interengage with each other like the condenser plates of a rotary condenser.

A second embodiment of the invention is illustrated in Figs. 7 to 10 showing a testing unit which is similar in principle to that shown in Figs. 1 to 6 and as previously described. A base 40 again supports a slide 41 so as to be easily movable thereon on rollers in the longitudinal direction, while slide 41, in turn, supports a measuring slide 42 so as to be movable in the same direction. However, as shown in Fig. 8, slide 42 is not movable on rollers relative to slide 41 but by being suspended on two leaf springs 43 and 44. Slide 42 again supports a pivotable feeler 45 which terminates in a measuring tip 45" designed in the form of a gear sector adapted to engage in the tooth gaps of a test object 46 which also in this example is shown as being in the form of a gear. In place of a pair of electromagnets as used in the first embodiment for reciprocating slide 41, an electric motor 47 is provided, the shaft of which carries a pinion 48 which engages wth a rack 49 which, in turn, is connected to slide 41 so as to move the latter toward or away from test object 46, depending upon the direction of rotation of motor 47. The operation of motor 47 is controlled by a switch 50 which is actuated by feeler 45 when being pivoted, and by another switch 51 acting as a circuit breaker which is actuated by the rack 49. Rack 49 is slidable relative to slide 41 and acts upon the same by means of a compression spring 52. Thus, if the forward movement of slide 41 is stopped by its engagement with stop ledge 53 mounted on the front edge of base 40, rack 49 will continue to move in the direction toward the test object 46 against the action of spring 52, at which time switch 51 will be opened so as to stop the rotation of motor 47. During the measuring procedure, slide 41 will be maintained in engagement with stop ledge 53 by the force of spring 52. Rack 49 will be prevented from retracting under the action of spring 52 by the provision of a speed reduction gear (not shown) on motor 47, the brake action of which is of sufficient strength to counteract the tendency of rack 49 to return.

Also in this embodiment, the measuring slide 42 carries a condenser plate 54 which is operatively associated with another condenser plate 55 on slide 41 in the same manner as described with reference to Figs. 1 to 6. Base 40 also carries an adjustable stop member 56 for limiting the movement of a lever 57 which is pivotably mounted on slide 41 and one end 58 of which is flexibly connected with the hub of feeler 45, while the other end 59 is acted upon by a spring 60 which pivots lever 57 until feeler 45 abuts against a set-screw 61 after such pivotal movement has been started by the engagement of the end 59 of lever 57 with stop member 56.

Fig. 11 shows a unit circuit diagram of the electric measuring system which may be applied in either of the embodiments as shown in Figs. 1 to 6 and 7 to 10, respectively. It comprises a pair of oscillatory circuits $a$ and $b$, the frequency of the first being dependent upon a change in the capacity of condenser 22, 23 in Fig. 1 or of condenser 54, 55 in Fig. 7, respectively, while oscillatory circuit $b$ produces an adjustable standard frequency. The frequencies produced in circuits $a$ and $b$ are superimposed in a mixing stage $c$ into a heterodyne frequency which is then amplified in an amplifier $d$ and converted into current and voltage values in a transformer $e$, and finally registered by a measuring instrument $f$ or recorded by a recording instrument $g$, or made audible by a loudspeaker $h$, possibly also for being recorded on a tape or wire recorder.

Figure 12:
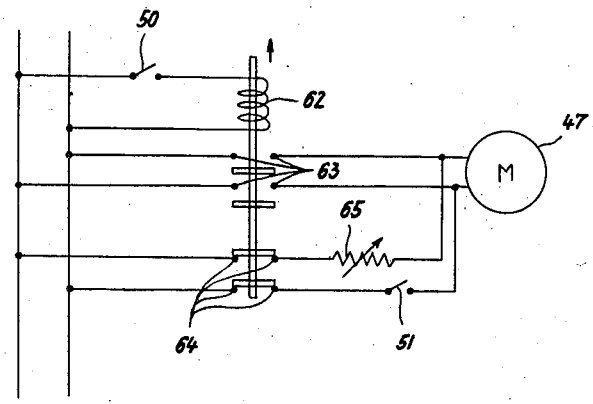
Fig. 12 shows a circuit diagram of the electric connections of the electric motor of the unit according to Fig. 7.

The electric circuit for operating the motor 47 to reciprocate slide 41 will now be described with reference to Figs. 11 and 12. After feeler 45 has passed beyond the measuring position, i.e. the "high point," it closes switch 50 and thereby energizes coil 62 of a contactor which, in turn, closes contacts 63 so as to start the rotation of motor 47 in the necessary direction for retracting rack 49. Since switch 51 is directly operated by rack 49, it will be closed at the beginning of such retraction, while the retraction of slide 41 will follow subsequently. As previously described, such retraction of slide 41 will result in a lateral pivoting of feeler 45 whereby at the end of the retracting movement of the slide 41 switch 50 will again be opened and coil 62 of the contactor be deenergized. Contacts 63 of the contactor will thus be opened and contacts 64 simultaneously closed. The polarity of motor 47 and thus also the direction of rotation thereof will thereby be reversed so that slide 41 will again run forwardly until it engages with stop ledge 53. Since rack 49 is then able to continue in its forward movement against the action of spring 52, it will open switch 51 and thereby disconnect and stop the motor 47, the speed of which may be adjusted by a potentiometer 65, as indicated in Fig. 12. The particular circuit for operating motor 47 as shown in this drawing, being the most simple type, has only been given as an example and may be replaced by any other suitable circuit and control elements as are known as such in the prior art.

Figure 13:
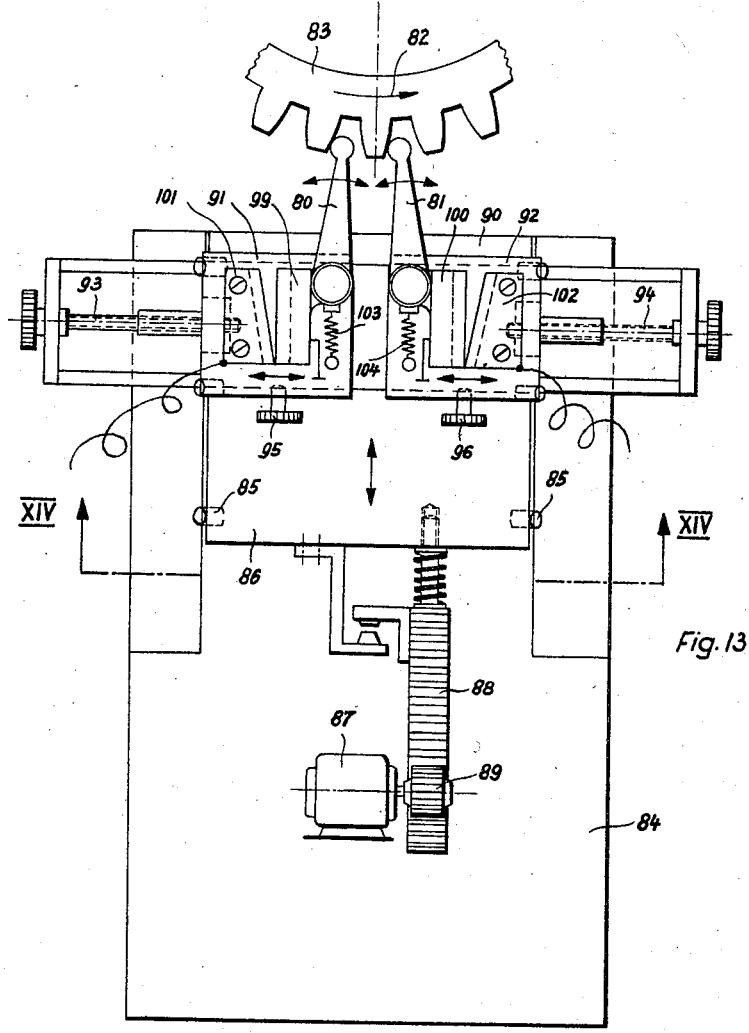
Fig. 13 shows a plan view of a third embodiment of the testing unit according to the invention.
Figure 14:
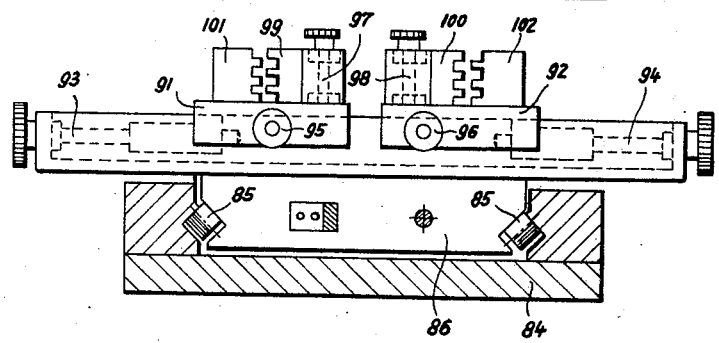
Figure 15:
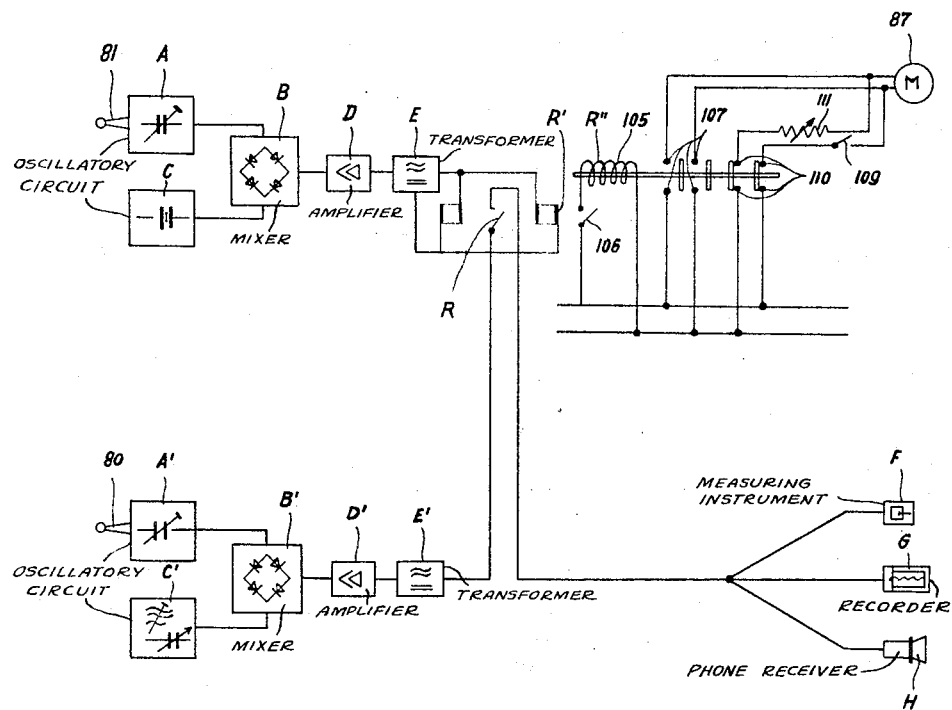
Fig. 15 shows a unit circuit diagram of the measuring system together with a circuit diagram of the electric connections of the electric motor of the unit according to Fig. 13.

Figs. 13 to 15 illustrate a third embodiment of the invention. Whereas the testing units of the first two embodiments are designed for measuring tooth errors in a radial direction, the unit according to Figs. 13 to 15 is designed for measuring in a tangential direction, that is, from one tooth face to the other. These measurements therefore require two feelers 80 and 81 which engage into two adjacent tooth gaps and against corresponding sides of the two adjacent tooth faces of a test object 83 which again has been shown in the form of a gear. The distance to be measured is that from one tooth face to the other by determining the relative angular position of the two feelers 80 and 81.

The testing unit for this type of measurement comprises a base 84 on which a slide 86 is mounted on rollers 85 for sliding movement in the longitudinal direction. Slide 86 is reciprocated toward and away from test object 83 by means of an electric motor 87, the pinion 89 of which engages with a rack 88 which, in turn, is connected with slide 86. When moved to its most forward position, slide 86 engages with and is stopped by a stop ledge 90 mounted on the front edge of base 84. Slide 86 further carries a pair of transverse slides 91 and 92, the distance of which relative to each other may be adjusted by means of threaded spindles 93 and 94, and which may be secured in a fixed position on slide 86 by means of setscrews 95 and 96. Each of these transverse slides 91 and 92 carries a feeler 80 and 81, respectively, which is pivotable about a vertical pivot pin 97 and 98, respectively. Each feeler 80 and 81 carries a condenser plate 99 and 100, respectively, which is associated with another condenser plate 101 and 102 mounted on the respective transverse slide 91 or 92 so as to form a pair of condensers 99, 101 and 100, 102. Thus, at any pivotal movement of feelers 80 and 81, the distances between the condenser plates and thus the capacity values of the two condensers will be changed accordingly.

At the beginning of the measurement, the two transverse slides 91 and 92 will be adjusted to the proper distance relative to each other in accordance with the tooth pitch of the test object 83 to be measured and moved into the proper measuring position relative to the test object in the manner as above described. Depending upon the angular position of the two feelers 80 and 81 each of the condensers 99, 101 and 100, 102 will then have a certain capacity value which may or may not be different from each other. Feeler 81 then serves for determining the measuring position since the test object 83 is also in this case to be moved continuously in the direction of the arrow 82. In such measuring position, condenser 100, 102 will furnish a definite capacity value, and the electric measuring apparatus as subsequently described will then provide that the capacity value of condenser 99, 101 will be transferred to the measuring apparatus at such particular moment when condenser 100, 102 reaches this fixed or standard capacity. Subsequently, slide 86 will be retracted by means of motor 87 and rack 88, and by the circuit as subsequently described, and thereafter slide 86 will be again advanced to the measuring position. The tips of the two feelers 80 and 81 will then engage into the next following tooth gaps of the continuously moving test object 83 and by such movement of the test object in the direction of arrow 82, they will be brought into engagement with the tooth faces and finally taken along by the latter so that the two feelers 80 and 81 will carry out a pivotal movement in the same direction. During this movement the capacity value of condenser 100, 102 changes until it reaches the predetermined capacity value which corresponds to the measuring position, at which particular moment the capacity value of condenser 99, 101 will be transferred to the electrical measuring system.

The measuring pressure under which the tip of each of the two feelers 80, and 81 engages with the tooth faces is determined by a spring 103 and 104, respectively. These springs are also provided for returning feelers 80 and 81 from the laterally pivoted position to a starting position after slide 86 has been retracted, so that the feelers can engage into the next following tooth gaps of the continuously moving test object 83 when slide 86 again advances.

Fig. 15 diagrammatically illustrates the circuit of the measuring system and the circuit provided for moving slide 86 periodically back and forth. In the course of the pivoting movement of the two feelers 80 and 81 the current change in capacity of condenser 100, 102 produced by the pivotal movement of feeler 81 will at first be converted into a frequency in an oscillatory circuit A and such frequency will be superimposed in a mixing stage B with a standard frequency which is freely adjustable and provided by an oscillatory circuit C, into a heterodyne frequency which is then amplified in an amplifier D and finally converted in a transformer E into current and voltage values. At the particular moment when condenser 100, 102 reaches the previously determined capacity value, that is, at the moment when the continuously moving test object 83 reaches the measuring position, the measuring apparatus A to E as just described will give a control impulse to a relay R which for a short time transmits the capacity value of condenser 99, 101 to the measuring unit. For evaluating the change in capacity of condenser 99, 101 which continuously varies in accordance with the pivotal movement of feeler 80, a similar circuit is provided as for evaluating the change in capacity of condenser 100, 102. Such continuously varying capacity of condenser 99, 101 is converted in an oscillatory circuit A' into a frequency which is superimposed in a mixing stage B' with an adjustable standard frequency produced in an oscillatory circuit C' into a heterodyne frequency which is then amplified in an amplifier D' and converted in a transformer E' into current and voltage values. At that particular moment when the measuring position is reached and relay R has been actuated, these latter values will then be registered by a measuring instrument F or recorded by a recording instrument G or made audible by a loudspeaker H, possibly for being recorded on a tape or wire recorder.

Relay R is designed so as to be deenergized after a certain length of time which may be freely adjustable and thus to disconnect the registering instruments F to G from the measuring apparatus A' to E'. Simultaneously with the actuation of relay R another relay R' has been actuated which has the following characteristics:

Relay R' is not energized until a certain length of time, for example, half a second, has elapsed after it has received the impulse, and it is deenergized automatically after a certain length of time which may be freely adjusted. The delay of the action of relay R' is made of such a length that it will not initiate the control operation which it is intended to carry out until after the measurement has been completed and relay R has again become deenergized. Relay R' controls a further relay R'', the coil 105 of which is connected to a potential through a switch 106 so that motor 87 will be connected through contacts 107 to rotate in such direction as is required for retracting slide 86 in the same manner as previously described with reference to Fig. 12. The first result hereof is that rack 88, which is movable relative to slide 86 and connected with the latter through compression spring 108, will start its retracting movement from test object 83, thereby close a switch 109, and then also retract slide 86 from the test object. As soon as relay R' is deenergized after a certain length of time has elapsed, switch 106 which is actuated by this relay and lies in the circuit of the coil of relay R" will be opened so that relay R" will be deenergized whereby the previously closed contacts 107 will be opened. At the same time, however, contacts 110 of relay R" will be closed so that the direction of rotation of motor 87 will be reversed since switch 109 which is mechanically operated by rack 88 has been closed. Because of the reversal of the direction of rotation of motor 87, slide 86 will then again move forwardly into the measuring position until it abuts against stop ledge 90 and is stopped thereby. Motor 87, however, continues to run and to move rack 88 further in the same direction, whereby switch 109 will be opened and motor 87 be stopped. For controlling the speed of the motor and thus also the speed of the movement of slide 86, the operation of motor 87 may be adjustable, for example, by means of a potentiometer 111 as diagrammatically indicated in Fig. 15.

As previously stated while slide 86 is being retracted, feelers 80 and 81 which are pivoted sideways by test object 83 are returned to their starting position by springs 103 and 104, and when slide 86 then again moves forwardly into the measuring position, the tips of feelers 80 and 81 engage into the next following tooth gaps of the continuously moving test object so that the measuring steps on the individual tooth pitches will automatically succeed each other.

Although my invention has been illustrated and described with reference to the preferred embodiments thereof, I wish to have it understood that these embodiments are only given as examples of the manner in which the invention may be carried out and that it is in no way limited to the details of such embodiments but is capable of numerous modifications within the scope of the appended claims.

Having thus fully disclosed my invention, what I claim is:

1. In an apparatus for automatically measuring and testing a continuously moving test object having a plurality of teeth and tooth gaps intermediate said teeth, a slide, at least one measuring feeler having a front contacting end pivotably mounted on said slide with the contacting end extending in the direction of movement of the slide, means for advancing said slide together with said feeler toward said moving test object to insert the front end of said feeler into a tooth gap thereof so that said feeler will then be taken along and pivoted by said moving test object from a starting position and past a measuring position to an end position, means for then retracting said slide together with said feeler from said test object, means for pivoting said feeler from its end position back to its starting position during the retraction of said slide, and means controlled by said feeler during the pivoting movements thereof for actuating said advancing and retracting means.

2. An apparatus as defined in claim 1, wherein two feelers are pivotably mounted on said slide and adapted to engage with their measuring ends into two different tooth gaps of said moving test object and against corresponding tooth faces of the teeth defining said gaps so as to be taken along and pivoted by said teeth in the same direction and to a point beyond said measuring position.

3. An apparatus as defined in claim 1, wherein two feelers are pivotably mounted on said slide and adapted to engage with their measuring ends into two different tooth gaps of said moving test object and against corresponding tooth faces of the teeth defining said gaps so as to be taken along and pivoted by said teeth in the same direction and to a point beyond said measuring position, a pair of variable condensers each having a plate mounted in a stationary position and another plate mounted on and movable with one of said feelers, respectively, and relative to said first plate, so that any pivotal movement of said feelers will result in changes in the capacity of said two condensers, and means for evaluating said changes.

4. An apparatus as defined in claim 3, wherein said means for evaluating said changes in the capacity of said two condensers comprise means for converting the variable capacity of said condensers into frequencies, a heterodyne circuit control means, and an electric measuring system, the variable frequency produced from the capacity of one of said condensers when reaching a certain value being adapted to actuate said control means so as to transfer the respective capacity value of the other condenser to said measuring system and, after an adjustable delay, to control the retraction and subsequent advance of said slide.

5. An apparatus as defined in claim 4, wherein said means for periodically advancing and retracting said slide comprise an electric motor, a pinion driven by said motor, a rack in geared engagement with said pinion and connected with said slide for moving the same, said control means being adapted to connect said motor to rotate in one direction to retract said slide and subsequently to reverse the direction of rotation of said motor to advance said slide, and contactor means including a circuit breaker for disconnecting and stopping said motor substantially during the period in which said feeler is in engagement with said test object.

6. An apparatus as defined in claim 1, wherein two feelers are pivotably mounted on said slide and adapted to engage with their measuring ends into two different tooth gaps of said moving test object and against corresponding tooth faces of the teeth defining said gaps so as to be taken along and pivoted by said teeth in the same direction and to a point beyond said measuring position, said means for pivoting each of said feelers back to its starting position during the retraction of said slide comprising at least one spring acting upon each of said feelers.

7. In an apparatus as claimed in claim 1, electrical means responsive to movement of said feeler to indicate the position thereof when engaged with the object to be tested.

8. In an apparatus as claimed in claim 1, means responsive to the movement of said slide towards the test object to indicate the position of the slide.

References Cited in the file of this patent
UNITED STATES PATENTS

| 1,254,062 | Olson | Jan. 22, 1918 |
| 2,775,041 | Pomernacki | Dec. 25, 1934 |

FOREIGN PATENTS

| 605,041 | Germany | Nov. 2, 1934 |